United States Patent
Guo et al.

(10) Patent No.: US 10,445,118 B2
(45) Date of Patent: Oct. 15, 2019

(54) METHODS AND APPARATUS TO FACILITATE FIELD-PROGRAMMABLE GATE ARRAY SUPPORT DURING RUNTIME EXECUTION OF COMPUTER READABLE INSTRUCTIONS

(71) Applicant: Intel Corporation, Santa Clara, CA (US)

(72) Inventors: Xiangyang Guo, Bellevue, WA (US); Simonjit Dutta, Sammamish, WA (US); Han Lee, Sammamish, WA (US); Yipeng Wang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/713,301

(22) Filed: Sep. 22, 2017

(65) Prior Publication Data
US 2019/0095229 A1    Mar. 28, 2019

(51) Int. Cl.
*G06F 9/44*      (2018.01)
*G06F 9/455*     (2018.01)
*G06F 8/41*      (2018.01)

(52) U.S. Cl.
CPC .............. *G06F 9/4552* (2013.01); *G06F 8/44* (2013.01); *G06F 8/41* (2013.01)

(58) Field of Classification Search
CPC .................................................. G06F 9/4552
See application file for complete search history.

(56) References Cited

U.S. PATENT DOCUMENTS 9,483,282 B1 *   11/2016   Vandervennet ..... G06F 15/7871
2013/0212365 A1 *  8/2013  Chen .................... G06F 17/5054
                                                         713/1

OTHER PUBLICATIONS

Greskamp et al., "A Virtual Machine for Merit-Based Runtime Reconfiguration," Proceedings of the 13th Annual IEEE Symposium on Field-Programmable Custom Computing Machines, 2005, 2 pages.
Altera, "FPGA Run-Time Reconfiguration: Two Approaches," Mar. 2008, ver. 1.0, 6 pages.
Intel, "Intel® FPGA SDK for OpenCL Best Practices Guide," May 8, 2017, 135 pages.

(Continued)

*Primary Examiner* — Hang Pan
(74) *Attorney, Agent, or Firm* — Hanley, Flight & Zimmerman, LLC

(57) ABSTRACT

Methods, apparatus, systems, and articles of manufacture to facilitate field-programmable gate array support during runtime execution of computer readable instructions are disclosed herein. An example apparatus includes a compiler to, prior to runtime, compile a block of code written as high level source code into a first hardware bitstream kernel and a second hardware bitstream kernel; a kernel selector to select the first hardware bitstream kernel based on an attribute to be dispatched during runtime; a dispatcher to dispatch the first hardware bitstream kernel to a field programmable gate array (FPGA) during runtime; and the kernel selector to, when an FPGA attribute does not satisfy a threshold during runtime, adjust the selection of the first hardware bitstream kernel to the second hardware bitstream kernel to be dispatched during runtime.

20 Claims, 7 Drawing Sheets

(56) References Cited

OTHER PUBLICATIONS

Bergeron et al., "Hardware JIT compilation for off-the-shelf dynamically reconfigurable FPGAs," DIRO, Universite de Montreal GRM, Ecole Polytechnique de Montreal, Budapest, Hungary, Mar. 29-Apr. 6, 2008, 16 pages.
Altera, "Machines Ensuring the Right Path," retrieved on Sep. 22, 2017, 4 pages.
Greaves, "Distributing C# Methods and Threads over Ethernet-connected FPGAs using Kiwi," 2011, 13 pages.
IBM Research, "Liquid Metal," retrieved on Sep. 22, 2017, http://researcher.watson.ibm.com/researcher/view_group.php?id=122, 4 pages.
Cray X1TM System, "Optimizing Processor-bound Code," http://docs.cray.com/books/S-2315-52/html-S-2315-52/z1073673157.html, 12 pages, retrieved on Sep. 22, 2017.
Raman et al., "Parcae: A System for Flexible Parallel Execution," Jun. 2012, 20 pages.
Huang et al., "Programming and Runtime Support to Blaze FPGA Accelerator Deployment at Datacenter Scale," Oct. 2016, 21 pages.

\* cited by examiner

METHODS AND APPARATUS TO FACILITATE FIELD-PROGRAMMABLE GATE ARRAY SUPPORT DURING RUNTIME EXECUTION OF COMPUTER READABLE INSTRUCTIONS

FIELD OF THE DISCLOSURE

This disclosure relates generally to field-programmable gate arrays and, more particularly, to methods and apparatus to facilitate field-programmable gate array support during runtime execution of computer readable instructions.

BACKGROUND

A field-programmable gate array (FPGA) may be used as an accelerator for some processes (e.g., image processing, machine learning, software defined networking, etc.) because of the high performance and high performance per watt of the FPGA. Hardware description language (HDL) (e.g., Very high speed integrated circuit HDL (VHDL), Verilog, etc.) may be used to program such processes. HDL is synthesized into netlist, which is placed and routed to generate a hardware bitstream. The bitstream is flashed into the FPGA to generate a customized accelerator. In some examples, FPGA may be programmed using an American National Standards Institute (ANSI) C-based language (e.g., Open Computing Language (OpenCL)), in which the C-based code is converted into a HDL kernel that may be compiled by the FPGA. Both HDL and OpenCL are static languages in which once the kernel is compiled, it will be loaded and executed by the FPGA during runtime without any runtime changes.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
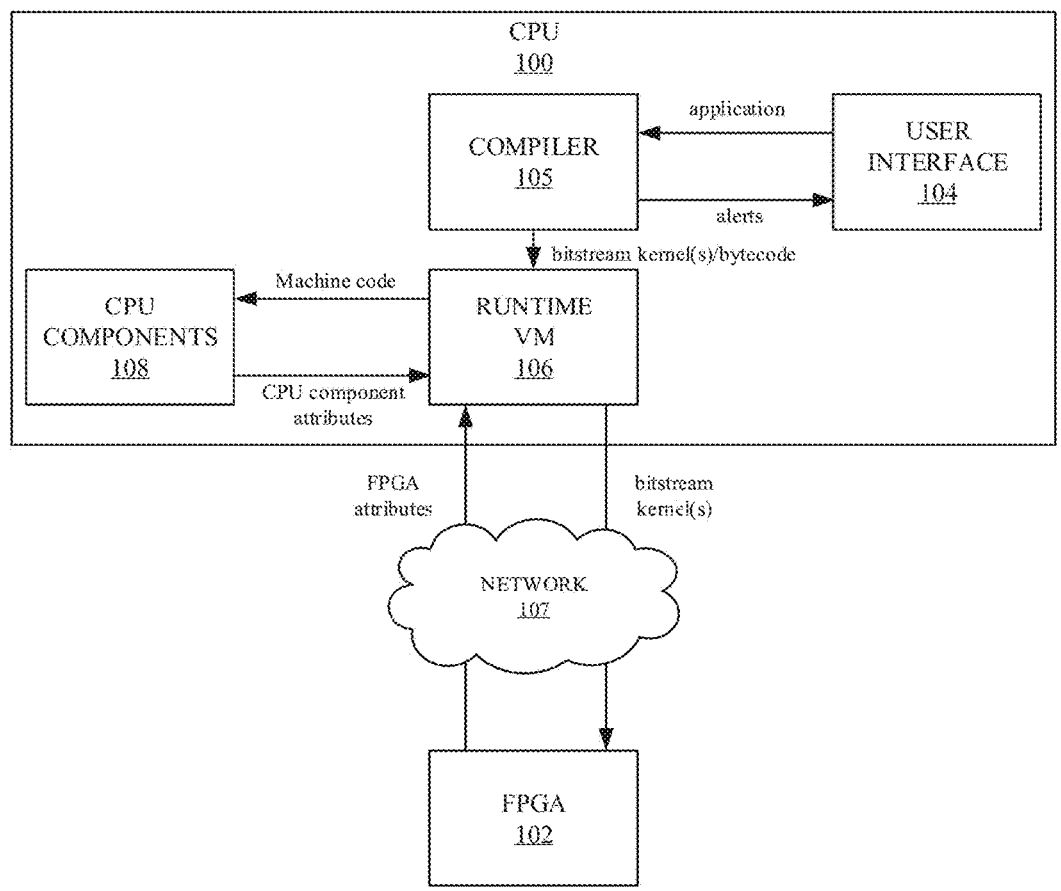
FIG. 1 illustrates a compilation and execution of high level source code using an example central processing unit and an example FPGA.

An FPGA is an integrated circuit that may be configured by a user or developer (e.g., programmable) using HDL, which is a specialized computer language requiring knowledge of hardware circuits. Accordingly, many software developers find developing a FPGA using HDL to be complicated and time consuming. An FPGA software development kit (SDK) for OpenCL has been released to allow software developers to program FPGAs using OpenCL (e.g., an ANSI C-based language), thereby allowing software developers to program FPGAs in a less complicated and less timing consuming manner. However, both HDL and OpenCL are static languages, meaning that once a kernel (e.g., a large block of code) is compiled, the kernel will be loaded and executed by a compiler during runtime without the ability to perform a runtime change.

Runtime environments that enable high level source code/ programming language (e.g., Java and/or C#) are interpreted and compiled at runtime. Such high level source codes can be optimized based on runtime information. Examples disclosed herein expose FPGA to runtime environments to achieve high performance and flexibility. Examples disclosed herein include utilizing a compiler (e.g., an ahead-of-time compiler) and a virtual machine (VM) to dynamically configure an FPGA during runtime.

Traditional techniques to expose FPGA to compilers include statically compiling blocks of all high level source code (e.g., classes or methods) into an FPGA bitstream. In this manner, at runtime, a virtual machine profiles the performance of the application and dynamically chooses either to run the FPGA bitstream version of the high level source code on the FPGA, or run the original bytecode versions (e.g., the high level instructions written in Java and/or C#) on the central processing unit (CPU). However, such traditional techniques do not allow for a developer to select blocks of code (e.g., class(es)/method(s)) written in a high level programming language to be compiled to an FPGA bitstream. Other traditional techniques include synthesizing and compiling a bitstream kernel during runtime. However, such traditional techniques are time-consuming and can only be applied to small kernels.

Examples disclosed herein allow a programmer to tag computationally intensive class(es)/method(s) written in an application using high level source code to be compiled to a hardware bitstream (e.g., a FPGA bitstream) to be executed by an FPGA. In some examples disclosed herein, a compiler (e.g., an ahead-of-time compiler) converts the tagged class(es)/method(s) into multiple versions (e.g., multiple kernels) of FPGA bitstream corresponding to different attributes (e.g., throughput performance, quality of service (QoS) guarantee, power consumption, etc.) prior to runtime (e.g., an offline compilation). For example, a compiler may convert a class/method into a first bitstream kernel that corresponds to high throughput and high power consumption and a second bitstream kernel that corresponds with a lower throughput and a lower power consumption prior to runtime. In such an example, if the developer desires high throughput (e.g., as written in a policy), a virtual machine with facilitate the execution of the FPGA bitstream using the first kernel during runtime. Examples disclosed herein further includes monitoring (e.g., profiling) the FPGA resources and comparing the resources to predetermined thresholds during runtime. In this manner, if the power consumption utilized while executing the first bitstream kernel is above a threshold, the virtual machine may dynamically adjust from the first bitstream kernel to the second bitstream kernel for subsequent executions of the class/method to reduce power consumption during runtime. Accordingly, examples disclosed herein dynamically choose which part of an application to run on the FPGA and choose which version of FPGA bitstream to run to trade-off performance, power/area, and/or other attributes during runtime.

FIG. 1 illustrates a compilation and execution of high level computer source code using an example CPU 100 and an example FPGA 102. The example CPU 100 includes an example user interface 104, an example compiler 105, an example runtime VM 106, an example network 107, and example CPU components 108.

The example CPU 100 of FIG. 1 includes electronic circuitry within a computing device that executes instructions of a computer program (e.g., an application developed by a developer) by performing operations specified by the program. The example CPU 100 executes the program sequentially by breaking up an algorithm into a sequence of operations and executing the operations one at a time. The example CPU 100 includes the example user interface 104 to interface with a developer, in which the example compiler 105 and the example runtime VM 106 facilitates compilation and execution of an application from the developer, and the example CPU components 108 to execute the compiled bytecode of the application.

The example FPGA 102 of FIG. 1 is an integrated circuit that is programmable to execute functions based on hardware bitstream (e.g., high level source code developed by a developer and converted into a hardware bitstream kernel). The example FPGA 102 can execute a kernel using parallel processing by executing multiple parts of an algorithm, or an entire algorithm, in a single tick of a clock. Accordingly, the example FPGA 102 is more efficient for computationally intensive class(es)/method(s) than the example CPU 100. In some examples, the runtime VM 106 of the example CPU 100 may monitor resources and/or performance of the example FPGA 102 to make adjustments during runtime execution of the application (e.g., runtime adjustments).

The example user interface 104 of FIG. 1 interfaces with a user/developer to receive an application (e.g., written as high level source code) and/or to receive preferences (e.g., attributes, policies, etc.) corresponding to how the application will be executed by the example CPU components 108 and/or the example FPGA 102. For example, a developer may tag one or more sections of code (e.g., classes and/or methods) to be compiled to one or more hardware bitstream kernels to be executed by the example FPGA 102. A developer may tag the classes and/or methods because the class and/or method is computationally intensive. However, because the resources of the example FPGA 102 may be limited, the example FPGA 102 may not be able to execute all the tagged classes/methods of the application during runtime. Accordingly, a developer may tag certain classes/methods for the example FPGA 102 to more efficiently execute the computationally intensive classes and/or methods, when called in the application. Additionally, the example user interface 104 may receive preferences from the developer corresponding to the tagged classes/methods. The preference may include how many different kernels should be made for a tagged class(es)/method(s), what attributes should be varied in the different kernels, and/or policies corresponding to which attributes should be optimized (e.g., throughput, QoS, power consumption, etc.). For example, a developer may (A) tag a method to be compiled into a hardware bitstream kernel and identify that the method should be compiled into 3 different kernels (e.g., with varying throughput performance) and (B) select a policy corresponding to optimizing for highest throughput performance. In some examples, the user interface 104 can provide the user with suggestions as to classes and/or methods that the example runtime VM 106 determines are computationally intensive based on previous runtime executions. In this manner, a developer can determine whether or not to tag the identified class/method for subsequent use of the application.

The example compiler 105 of FIG. 1 is an ahead-of-time compiler that receives the application from the example user interface 104 and converts (e.g., compiles) the tagged classes/methods written as high level source code to hardware bitstream kernels prior to runtime based on the developer defined preferences (e.g., tags, policies, etc.) and/or predetermined configurations. The example compiler 105 further compiles the high level source code into bytecode that may be translated to machine code readable by the example CPU components 108 to perform the corresponding functions of the application. The VM machine 106 converts the bytecode into machine code. The example compiler 105 transmits the compiled bytecode, and/or the hardware bitstream kernels to the example runtime VM 106. The example compiler 105 is further describe below in conjunction with FIG. 2.

The example runtime VM 106 of FIG. 1 profiles the most utilized tagged class(es)/method(s) in an application (e.g., by generating an order or hierarchy) to make determination on which kernels to use if FPGA resources are low, power consumption is high, etc. The example runtime VM 106 dispatches compiled bytecode to the example CPU components 108 and compiled hardware bitstream kernels to the example FPGA 102 (e.g., directly or via the example network 107) for execution during runtime. Additionally, the example runtime VM 106 monitors the example CPU components 108 and the example FPGA 102 during runtime to determine the performance of the application and make runtime adjustments based on the monitored performance. In some examples, the runtime VM 106 identifies non-tagged classes/methods that are computationally intensive to allow a developer to tag such classes/methods in subsequent executions of the application. The example runtime VM 106 is further described below in conjunction with FIG. 2.

The example network 107 of FIG. 1 is a system of interconnected systems and/or connections exchanging data. The example network 107 may be implemented using any type of public or private network such as, but not limited to, a bus, a peripheral component interconnect (PCI), and/or any other network or wireless network connection. In this manner, the example CPU 100 may be connected to multiple FPGAs and/or the example FPGA 102 may be connected to multiple CPUs. Although the illustrated example of FIG. 1 includes the example network 107, the example CPU 100 may be connected directly with the example FPGA 102 (e.g., via a wired connection).

The example CPU components 108 of FIG. 1 receive the dispatched bytecode from the example runtime VM 106 to operate the executable program corresponding to the application developed by a developer. As described above, the example runtime VM 106 may monitor resources and/or performance of the example CPU components 108 to make runtime adjustment.

Figure 2:
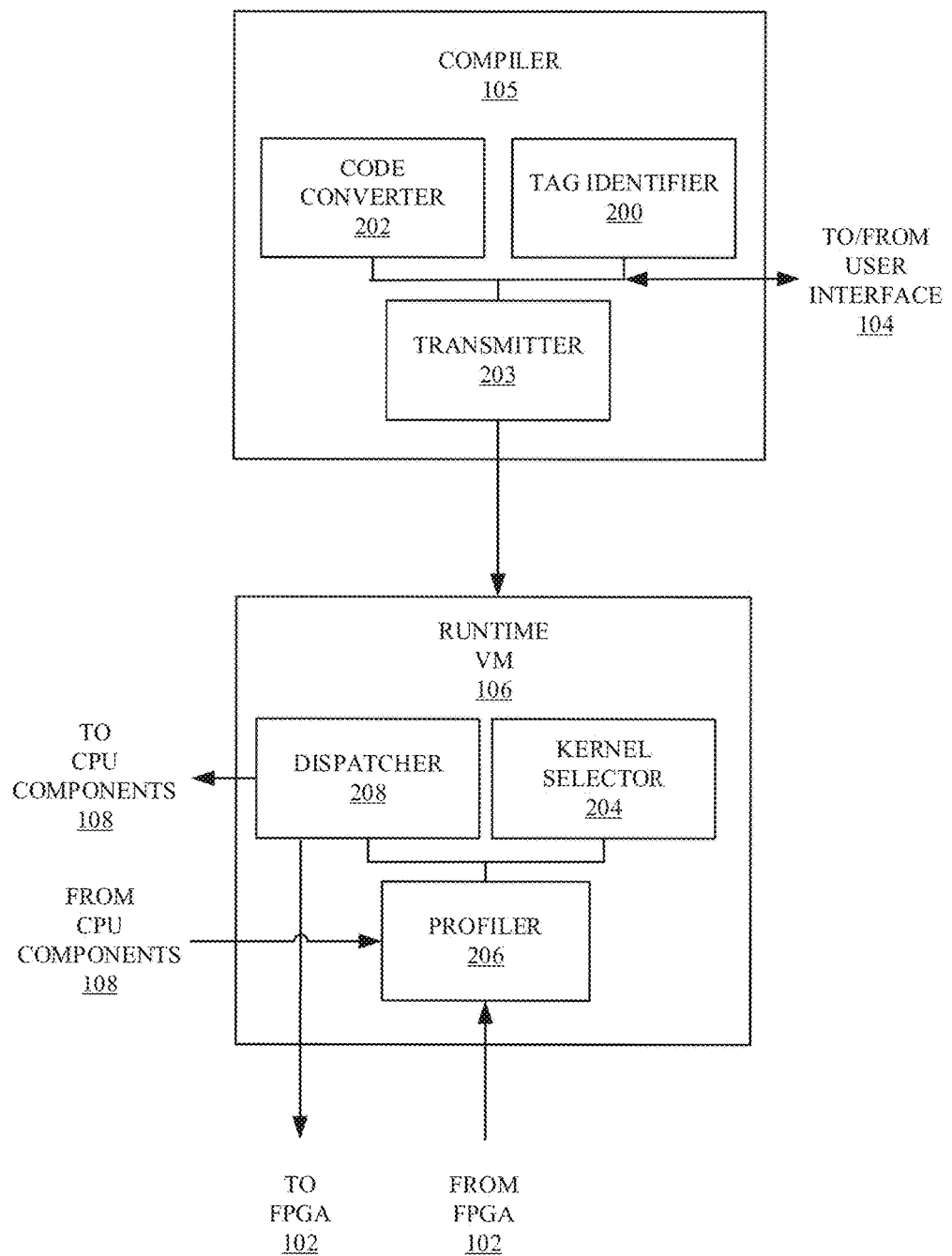
FIG. 2 is a block diagram of an example compiler and an example runtime virtual machine of FIG. 1

FIG. 2 is a block diagram of the example compiler 105 and the example runtime VM 106 of FIG. 1. The example compiler 105 includes an example tag identifier 200, an example code converter 202, and an example transmitter 203, and the example runtime VM 106 includes an example kernel selector 204, an example profiler 206, and an example dispatcher 208.

The example tag identifier 200 of FIG. 2 receives the application developed by a developer via the example user interface 104 along with any attributes, policy, and/or preferences for execution of the application. As described above, the application may include class(es)/method(s) that are tagged to be compiled into hardware bitstream kernels and executed by the example FPGA 102 of FIG. 1. The example tag identifier 200 identifies such tags in the received application. Additionally, the example tag identifier 200 determines if there are any attributes, policies, and/or preferences corresponding to the execution of the tagged class(es)/ method(s) identified by the developer within the application. For example, the application may include code and/or a tag identifying (A) how many different versions of hardware bitstream kernels corresponding to the tagged class(es)/ method(s) should be compiled, (B) how to differentiate the kernels, and/or (C) a policy identifying an attribute to be optimized (e.g., throughput performance, power consumption, QoS, etc.).

The example code converter 202 of FIG. 2 compiles the high level source code of the application into bytecode (e.g., 'javac' to generate java bytecode, 'csc' to generate Microsoft Intermediate Language (MSIL), 'dx' to generate Dalvik bytecode, etc.) so that the instructions can be executed by the example CPU component 108 of FIG. 1. Additionally, the example code converter 202 compiles the high level source code of the tagged class(es)/method(s) into hardware bitstream (e.g., FPGA bitstream) kernels so that the instructions can be executed by the example FPGA 102. In some examples, the code converter 202 compiles multiple versions (e.g., multiple kernels) for each tagged class(es)/ method(s), each version corresponding to different attributes. For example, the code converter 202 may generate a first bitstream kernel (e.g., a single work-item kernel) that does not take advantage of data parallelism (e.g., corresponding to a lower throughput) and a second bitstream kernel (e.g., a NDRange kernel) that does take advantage of data parallelism (e.g., corresponding to higher throughput than the first kernel). In such an example, the first kernel may require less FPGA resources and less power than the second kernel. Accordingly, during runtime, the example kernel selector 204 of the example runtime VM 106 may adjust what bitstream kernel should be used for the corresponding class/method based on the status of the example FPGA 102. The example transmitter 203 of the example compiler 105 transmits the compiled bytecode and/or hardware bitstream kernels to the example runtime VM 106. In some examples, the transmitter 203 transmits user preferences, policies, etc. to the example runtime VM 106. In some examples, the runtime VM 106 interfaces directly with the user interface 104 to gather the user preferences, policies, etc.

Figure 4:
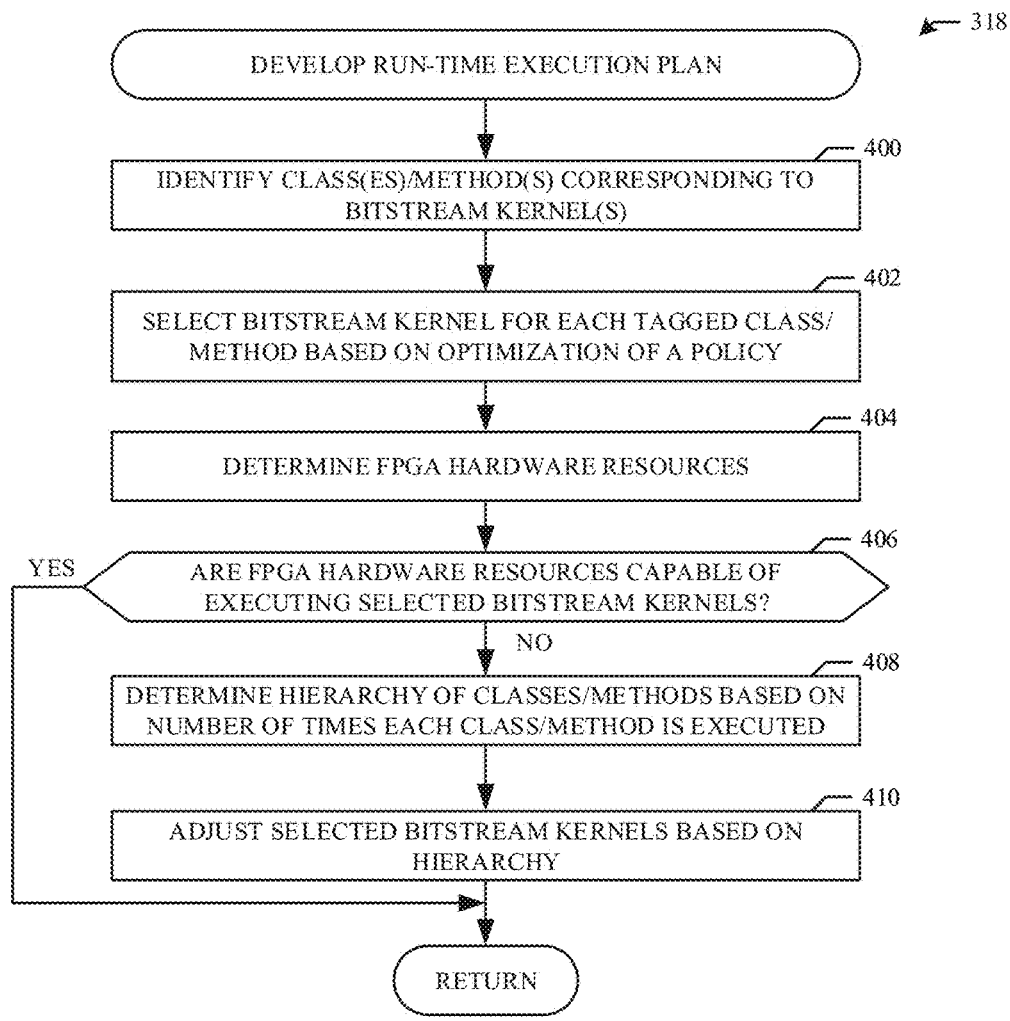

The example kernel selector 204 of FIG. 4 selects which received bitstream kernel is to be dispatched to the example FPGA 102 for execution. As described above, each tagged class/method may be compiled into multiple different bitstream kernels, each corresponding to different attributes (e.g., throughput performance, power consumption, etc.). Accordingly, prior to, and/or during, runtime, the kernel selector 204 selects a bitstream kernel to be dispatched to the example FPGA 102 for execution based on a policy (e.g., defined by the developer and/or predetermined). For example, if the policy corresponds to achieving a highest overall throughput and two methods are tagged for FPGA support, the example kernel selector 204 selects a bitstream kernel for each method corresponding to the highest throughput (e.g., a NDRange kernel). In such an example, if the kernel selector 204 determines that there are not enough hardware resources of the example FPGA 102 (e.g., the example profiler 206 determining the resources, as further described below) to load both the high throughput bitstream kernel for both the first and second methods, the kernel selector 204 optimizes the FPGA support by utilizing the high throughput bitstream kernel for the method that is executed more often in the application (e.g., determined by the example profiler 206, as further described below) and a lower throughput kernel (e.g., Single Work Item kernel) for the other method, thereby conserving hardware resources and optimize throughput as much as possible for the application. If there are still not enough FPGA resources to execute the first method using the first bitstream kernel and the second method using the second bitstream kernel, the example kernel selector 204 utilizes the first method using the second bitstream kernel and the first method using the first bitstream kernel. In this manner, the example kernel selector 204 utilizes the highest throughput bitstream kernels available for both methods while satisfying the available resources of the FPGA 102.

In another example, a policy for an auto-driving system application may correspond to guarantee QoS requirements, in which a first tagged method is a lower priority than a second tagged method (e.g., the second tagged method is also tagged as critical or high priority by the developer). For example, the first method may correspond to an entertainment task, while the second method corresponding to an auto-braking task. In such an example, the first method may be executed more often in the application than the second method. However, the second method takes priority because of the high priority tag. Accordingly, if the example kernel selector 204 determines that there are not enough FPGA resources to load (e.g., dispatch) both the first and second methods compiled into bitstream kernels into the example FPGA 102, the example kernel selector 204 selects the second method compiled into a bitstream kernel to be dispatched first, while there are enough FPGA resources for execution. The kernel selector 204 may dispatch the second method as a bitstream kernel (e.g., corresponding to less FPGA resources) into the FPGA 102 after the first method (e.g., depending on the availability of the FPGA resources), or may dispatch the second method as machine code corresponding to the bytecode to the example CPU components 108.

In another example, a policy for an application may correspond to achieving lowest power consumption. In such an example, a first tagged method and a second tagged method are compiled into two different bitstream kernels (e.g., an NDRange kernel and a Single Work-Item kernel). Even though the NDRange kernel has a higher performance than the Single Work-Item kernel, the example kernel selector 204 will select the Single Work-Item kernels to be dispatched to the example FPGA 102 for both tagged methods because the Single Work-Item kernels achieve lower power consumption.

During runtime, the example kernel selector 204 of FIG. 2 may adjust which bitstream kernel should be dispatched during runtime for one or more methods based on the status of attributes (e.g., performance, QoS guarantee, power efficiency, etc.) of the example FPGA 102 and/or the example CPU components 108. For example, if the power consumption (e.g., a first attribute) corresponding to the example FPGA 102 goes above a maximum threshold (e.g., predefined and/or based on developer preferences defined in a policy), the example kernel selector 204 may adjust the selected bitstream kernels for one or more tagged classes/ methods to bitstream kernels that correspond to lower power consumption, thereby reducing the power consumption to a level below the minimum threshold. Additionally or alternatively, during runtime, the example kernel selector 204 may switch the tagged kernels to be executed by the example CPU components 108 using machine code corresponding to the bytecode if the FPGA 102 does not provide sufficient performance, QoS guarantee, and/or power efficiency (e.g., based on comparison with one or more thresholds). The status attributes may or may not be the same as the attributes identified in the policy (e.g., for optimization). For example, a policy may correspond to a high throughput and a status attribute that leads to a runtime adjustment of the selection of the bitstream kernels may be based on power consumption.

The example profiler 206 of FIG. 2 profiles the class(es)/method(s) of the application and monitors the status (e.g., corresponding to attributes such as resources, performance, QoS guarantees, power consumption, etc.) of the example CPU components 108 and/or the example FPGA 102. Prior to runtime, the example profiler 206 identifies the available resources of the example CPU components 108 and the example FPGA 102. Additionally, prior to runtime, the example profiler 206 processes a received application to identify an order (e.g., hierarchy) of use of the tagged classes/methods (e.g., based on the amount of times each class/method is called in the application). For example, if an application calls a first tagged method three times, a second tagged method eight times, and a third tagged method two times, the example profiler 206 develops a use hierarchy identifying the second tagged method as the most used, the first tagged method as the second most used, and the third tagged method as the least used. As described above, the example kernel selector 204 may select a bitstream kernel for a tagged class/method based on how many times the class/method is called in the application. For example, if there are not enough FPGA resources to execute all of the methods/classes tagged for FPGA support, the example kernel selector 204 selects the less-executed kernels (e.g., the classes/methods that occur least often in the application) for CPU execution and the more-executed kernels for execution by the example FPGA 102.

During runtime, the example profiler 206 of FIG. 2 monitors the status of the example CPU components 108 and/or the example FPGA 102. For example, the profiler 206 may monitor FPGA 102/CPU components 108 attributes such as the performance, QoS, power efficiency, resources used, etc. In this manner, the example kernel selector 204 can adjust the pre-runtime selected bitstream kernels when the status of the example CPU components 108 and/or the example FPGA 102 is unacceptable (e.g., the power efficiency is too low, the performance is poor, there are too few available resources, etc.). Additionally, the example profiler 206 monitors the performance of classes/methods using the example CPU components 108 that were not tagged for FPGA support to identify (e.g., flag) computationally intensive classes/methods. In some examples, the example profiler 206 may transmit the computationally intensive (e.g., flagged) classes/methods to be displayed to the developer via the example user interface 104. In this manner, the developer can determine whether to tag the identified classes/methods for FPGA support in subsequent executions of the application.

The example dispatcher 208 of FIG. 2 dispatches the compiled code to the example CPU components 108 and/or the example FPGA 102. The example dispatcher 208 dispatches the untagged code (e.g., untagged classes/methods) compiled into bytecode as machine code to the example CPU components 108 during runtime. The example dispatcher 208 converts the bytecode to machine code when dispatching to the example CPU components 108. The example dispatcher 208 dispatches tagged code (e.g., tagged classes/methods) to the example CPU components 108 or the example FPGA 102 depending on the instructions from the example kernel selector 204. For example, if the kernel selector 204 selects a bitstream kernel for a tagged class/method, the example dispatcher 208 dispatches the bitstream kernel to the example FPGA 102. In some examples, the example kernel selector 204 may alternatively decide to dispatch a tagged class/method to the example CPU components 108 using machine code corresponding to the bytecode based on the performance of the example FPGA 102. In such examples, the dispatcher 208 dispatches the corresponding machine code to the example CPU components 108.

While an example manner of implementing the example compiler 105 and/or example runtime VM 106 of FIG. 1 are illustrated in FIG. 2, one or more of the elements, processes and/or devices illustrated in FIG. 2 may be combined, divided, re-arranged, omitted, eliminated and/or implemented in any other way. Further, the example tag identifier 200, the example code converter 202, the example transmitter 203, the example kernel selector 204, the example profiler 206, the example dispatcher 208, and/or, more generally, the example compiler 105 and/or the example runtime VM 106 of FIG. 2 may be implemented by hardware, software, firmware and/or any combination of hardware, software and/or firmware. Thus, for example, any of the example tag identifier 200, the example code converter 202, the example transmitter 203, the example kernel selector 204, the example profiler 206, the example dispatcher 208, and/or, more generally, the example compiler 105 and/or the example runtime VM 106 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example tag identifier 200, the example code converter 202, the example transmitter 203, the example kernel selector 204, the example profiler 206, and/or the example compiler 105 and/or the example dispatcher 208 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example compiler 105 and/or the example runtime VM 106 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example compiler 105 and/or the example runtime VM 106 of FIG. 1 are shown in FIGS. 3-5B. In this example, the machine readable instructions comprise a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-5B, many other methods of implementing the example runtime VM 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-5B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 3:
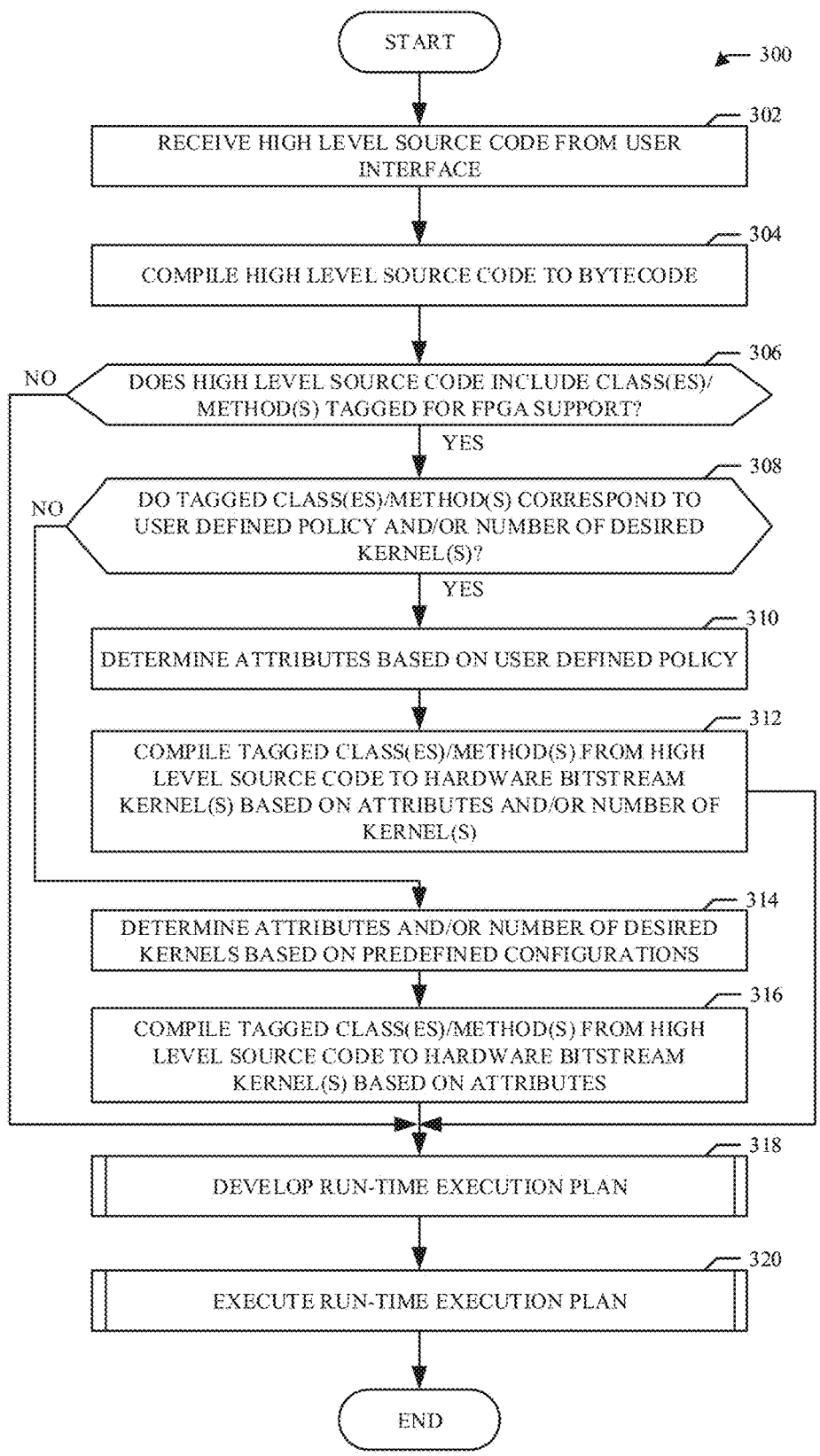
FIGS. 3-5B are example flowcharts representative of example machine readable instructions that may be executed by the example compiler and/or the example runtime virtual machine of FIGS. 1 and/or 2.

FIG. 3 is an example flowchart 300 representative of example machine readable instructions that may be executed by the compiler 105 and/or the example runtime VM 106 of FIG. 2 to facilitate FPGA support during runtime execution of computer readable instructions.

At block 302, the example tag identifier 200 receives high level source code from the user interface 104 of FIG. 1. The high level source code corresponds to an application written by a developer via the example user interface 104. At block 304, the example code converter 202 compiles the high level source code into bytecode. At block 306, the example tag identifier 200 determines if the high level source code includes class(es)/methods(s) tagged for FPGA support. If the example tag identifier 200 determines that the high level source code does not include class(es)/method(s) tagged for FPGA support (block 306: NO), the process continues to block 314, as further described below.

If the example tag identifier 200 determines that the high level source code does include class(es)/method(s) tagged for FPGA support (block 306: YES), the example tag identifier 200 determines if the tagged class(es)/methods(s) correspond to a user defined policy and/or number of desired kernels (block 308). As explained above in conjunction with FIG. 2, the develop may include a policy for the application (e.g., corresponding with one or more attributes to optimize during run-time). Additionally or alternatively, the developer may program a desired number of kernels for each tagged class. For example, the developer may program a method to be compiled into three different bitstream kernels corresponding to varying levels of power consumption.

If the example tag identifier 200 determines that the tagged class(es)/method(s) corresponds to a user defined policy and/or number of desired kernels (block 308: YES), the example tag identifier 200 determines the attributes corresponding to the user defined policy (block 310). At block 312, the example code converter 202 compiles the tagged class(es)/method(s) from high level source code to hardware bitstream kernel(s) based on the attributes and/or number of desired kernel(s). If the example tag identifier 200 determines that the tagged class(es)/method(s) does not correspond to a user defined policy and/or number of desired kernels (block 308: NO), the example tag identifier 200 determines attributes and/or number of desired kernels based on predefined configurations (e.g., a predefined policy and/or a predefined number of kernels for a tagged class/method) (block 314). At block 316, the example code converter 202 compiles the tagged class(es)/method(s) from high level source code to a hardware bitstream kernel(s) based on the attributes.

At block 318, the example runtime VM 106 develops a run-time execution plan prior to runtime execution of the application, as further described below in conjunction with FIG. 4. At block 320, the example runtime VM 106 executes the run-time execution plan, as further described below in conjunction with FIGS. 5A-5B.

FIG. 4 is an example flowchart 318 representative of example machine readable instructions that may be executed by the example runtime VM 106 of FIG. 2 to develop a run-time execution plan, as described above in conjunction with block 318.

At block 400, the kernel selector 204 identifies a class(es)/method(s) corresponding to bitstream kernel(s) (e.g., a tagged class(es)/method(s) that have been compiled into bitstream kernel(s)). At block 402, the example kernel selector 204 selects a bitstream kernel for each tagged class/method based on optimization of a policy (e.g., a policy of attribute(s) to be optimized defined by a develop or a predefined policy corresponding to the predefined configurations). For example, if the policy corresponds to highest overall throughput, the example kernel selector 204 selects a bitstream kernel for each tagged class/method that corresponds to the highest overall throughput.

At block 404, the example profiler 206 determines the FPGA hardware resources (e.g., the available hardware resources of the example FPGA 102). At block 406, the example kernel selector 204 determines if the FPGA hardware resources are capable of executing the selected bitstream kernels (block 406). If the example kernel selector 204 determines that the FPGA hardware resources are capable of executing the selected bitstream kernels (block 406: YES), the process returns to block 320 of FIG. 3. If the example kernel selector 204 determines that the FPGA hardware resources are not capable of executing the selected bitstream kernels (block 406: NO), the example profiler 206 determines a hierarchy (e.g., order) of the tagged class(es)/method(s) based on the number of times each class/method is executed in the application (block 408). At block 410, the example kernel selector 204 adjusts one or more of the selected bitstream kernels based on the hierarchy. For example, if the example kernel selector 204 selects a high throughput kernel for three tagged methods and determines that there are not enough FPGA resources to execute all three selected bitstream kernels, the example kernel selector 204 adjusts the least used method (e.g., the lowest method in the hierarchy) to a lower throughput bitstream kernel to satisfy the availability of FPGA resources.

Figure 5A:
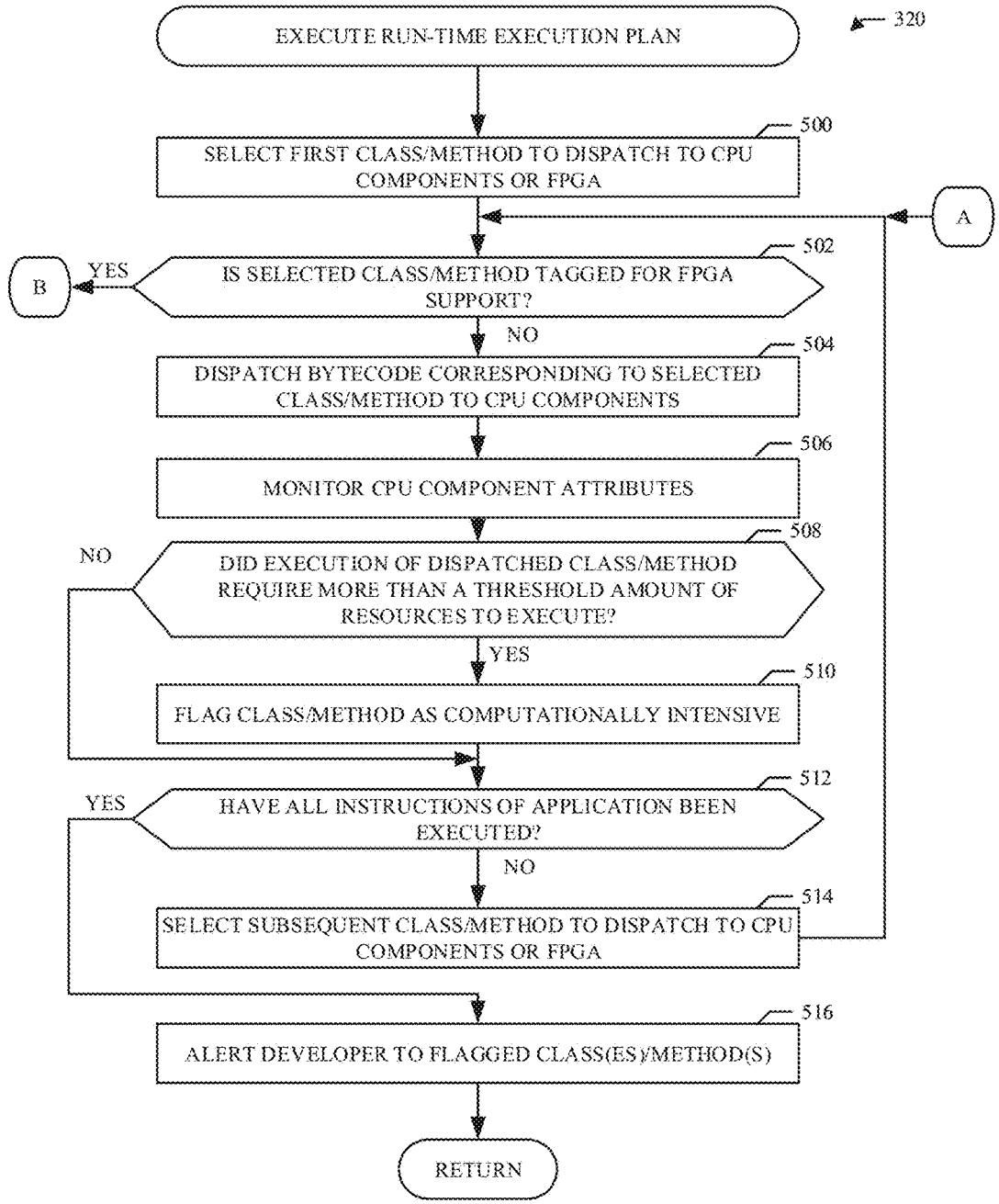
Figure 5B:
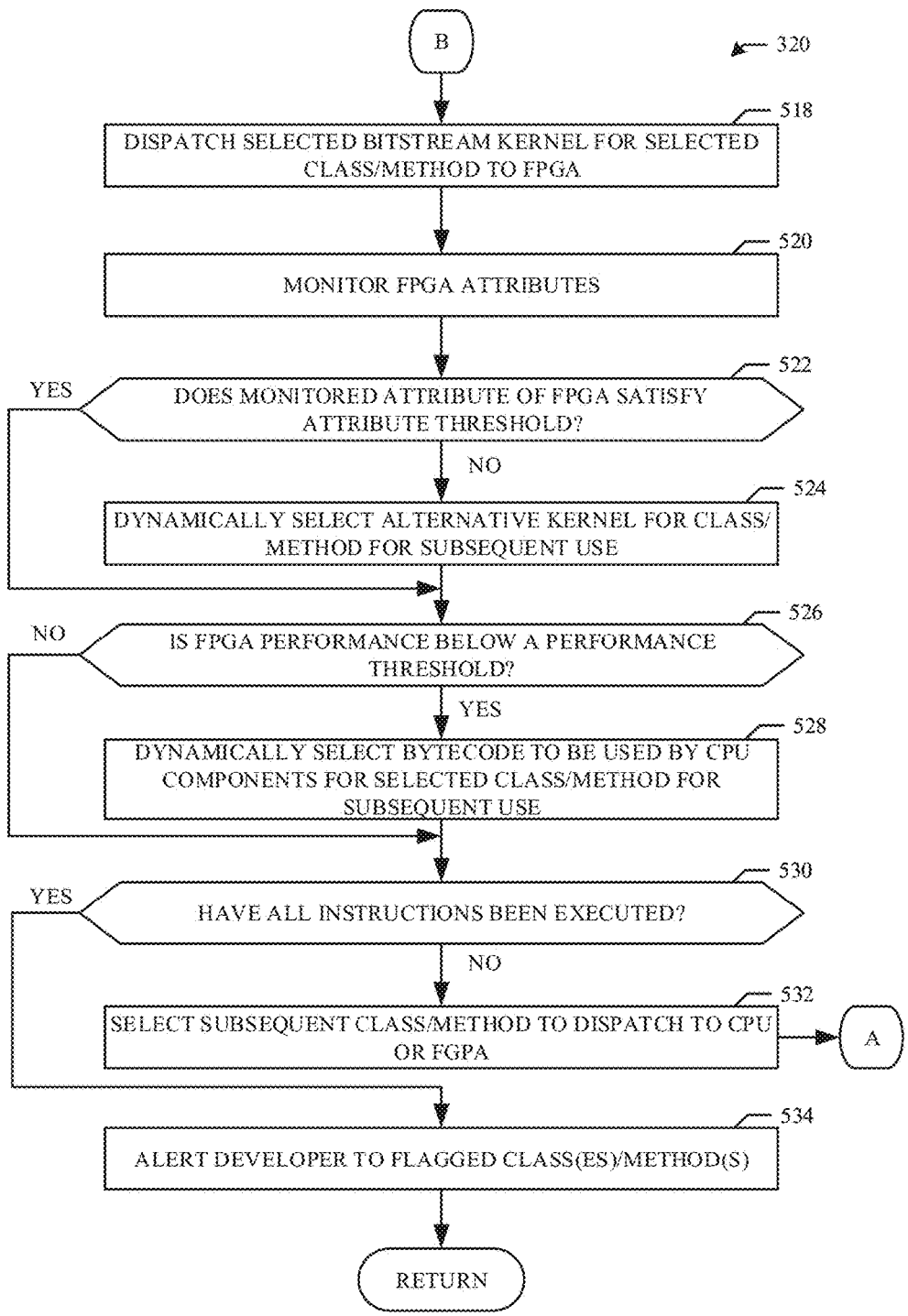

FIGS. 5A-5B illustrates an example flowchart 320 representative of example machine readable instructions that may be executed by the example runtime VM 106 of FIG. 2 to execute a run-time execution plan, as described above in conjunction with block 320.

At block 500, the example dispatcher 208 selects a first class/method to dispatch to the example CPU components 108 or the example FPGA 102. In some examples, the dispatcher 208 selects a first class/method based on a QoS guarantee that identifies high priority or critical classes/methods, the ensure that such classes/methods are executed first.

At block 502, the dispatcher 208 determines if the selected class/method tagged for FPGA support (e.g., has the selected class/method been compiled into hardware bitstream kernels). If the example dispatcher 208 determines that the selected class/method is tagged for FPGA support (block 502: YES), the process continues to block 518 of FIG. 5B, as further described below. If the example dispatcher 208 determines that the selected class/method is not tagged for FPGA support (e.g., the selected class/method has been selected to be executed using machine code corresponding to the bytecode) (block 502: NO), the example dispatcher 208 dispatches the machine code corresponding to the bytecode corresponding to the selected class/method to the example CPU components 108 (block 504). At block 506, as the CPU components 108 execute the machine code corresponding to the bytecode during runtime, the example profiler 206 monitors the CPU component status attributes (e.g., resources being used, power being consumed, etc.).

At block 508, the example profiler 206 determines if the execution of the dispatched class/method requires more than a threshold amount of resources to execute the machine code corresponding to the bytecode. The example profiler 206 determines if the execution of the dispatched class/method requires more than a threshold amount of resources to provide feedback to the developer that the class/method is computationally intensive. In this manner, the developer can decide whether or not to tag the class/method for FPGA support in future implementations of the application. If the example profiler 206 determines that the execution of the dispatched class/method does not require more than a threshold amount of resources to execute the bytecode (e.g., machine code corresponding to the bytecode) (block 508: NO), the process continues to block 512, as further described below. If the example profiler 206 determines that the execution of the dispatched class/method requires more than a threshold amount of resources to execute the bytecode (e.g., machine code corresponding to the bytecode) (block 508: YES), the example profiler 206 flags the selected class/method as computationally intensive (block 510).

At block 512, the example dispatcher 208 determines if all the instructions of the application have been executed. If the example dispatcher 208 determines that all of the instructions of the application have not been executed (block 512: NO), the example dispatcher 208 to select a subsequent class/method to dispatch to the example CPU components 108 or the example FPGA 102 (block 514). If the example dispatcher 208 determines that all of the instructions of the application have been executed (block 512: YES), the example dispatcher 208 alerts the developer to the flagged class(es)/method(s) (block 516) via the example user interface 104 of FIG. 1.

As described above, if the example dispatcher 208 determines that the selected class/method is tagged for FPGA support (block 502: YES), the example dispatcher 208 dispatches the selected bitstream kernel for the selected class/method (e.g., selected at block 402 of FIG. 4) to the example FPGA 102 (block 518). At block 520, as the FPGA 102 executes the bitstream kernel during runtime, the example profiler 206 monitors FPGA status attributes (e.g., resources being used, power being consumed, etc.). At block 522, the example profiler 206 determines if a monitored status attribute of the example FPGA 102 satisfies an attribute threshold. The attribute/attribute threshold may correspond to available resources, power consumption, throughput performance, etc. For example, if the amount of power consumed by the FPGA 102 is above a maximum power threshold, the example profiler 206 determines that the monitored status attributes (e.g., power consumption) does not satisfy the attribute threshold.

If the example profiler 206 determines that the monitored attribute of the example FPGA 102 does satisfy the attribute threshold (block 522: YES), the process continues to block 526, as further described below. If the example profiler 206 determines that the monitored attribute of the example FPGA 102 does not satisfy the attribute threshold (block 522: NO), the example kernel selector 204 dynamically (e.g., during runtime) selects an alternative bitstream kernel for the class/method for subsequent use during runtime (block 524). For example, the kernel selector 204 selects a different bitstream kernel that was compiled prior to runtime that corresponds to a desired FPGA status (e.g., less power consumption, less required resources, etc.)

At block 526, the example profiler 206 determines if the FPGA performance is below a performance threshold. If the example profiler 206 determines that the FPGA performance is not below the performance threshold (block 526: NO), the process continues to block 530. If the example profiler 206 determines that the FPGA performance is below the performance threshold (block 526: YES), the example kernel selector 204 dynamically (e.g., during runtime) selects bytecode to be used by the example CPU components 108 for selected class/method for subsequent use during runtime (block 528).

At block 530, the example dispatcher 208 determines if all the instructions of the application have been executed. If the example dispatcher 208 determines that all of the instructions of the application have not been executed (block 530: NO), the example dispatcher 208 to select a subsequent class/method to dispatch to the example CPU components 108 or the example FPGA 102 (block 532) and returns to block 502 of FIG. 5A. If the example dispatcher 208 determines that all of the instructions of the application have been executed (block 530: YES), the example dispatcher 208 alerts the developer to the flagged class(es)/method(s) (block 534) via the example user interface 104 of FIG. 1.

Figure 6:
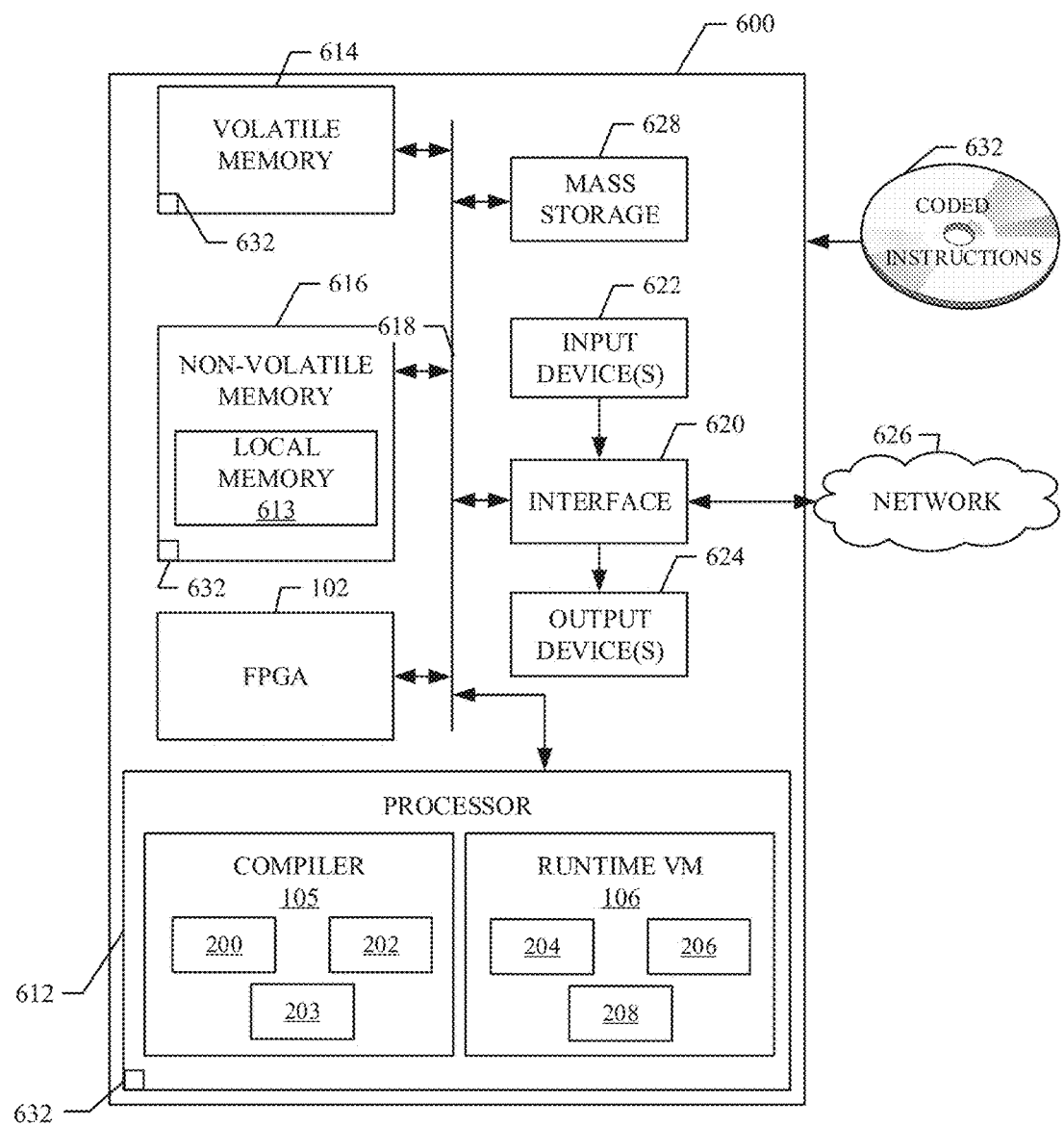
FIG. 6 is a block diagram of an example processing device that may execute the instructions of FIGS. 3-5B to implement the example compiler and/or the example runtime virtual machine of FIG. 2.

FIG. 6 is a block diagram of an example processor platform 600 capable of executing the instructions of FIGS. 3-5B to implement the example runtime VM 106 of FIG. 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, an automatic driving system, a transportation computing system (e.g., for cars, planes, boats, trains, drones, etc.), an electronic control unit (EDU), an instrument panel, a transmission controller, an autopilot system, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor implements the example tag identifier 200, the example code converter 202, the example transmitter 203, the example kernel selector 204, the example profiler 206, and/or the example dispatcher 208.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, a keyboard, a button, a mouse, a touchscreen, a track-pad, a trackball, isopoint, a sensor (e.g., a three-dimensional sensor) and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-5B may be stored in the mass storage device 628, in the volatile memory 614, in the non-volatile memory 616, and/or on a removable tangible computer readable storage medium such as a CD or DVD.

The example FPGA 102 of FIG. 6 stores and executes bitstream kernels generated by the example processor 612. The example processor 612 may monitor resources of the FPGA 102 during runtime to determine the status of the FPGA.

From the foregoing, it will be appreciated that example methods, apparatus and articles of manufacture have been disclosed that facilitate field-programmable gate array support during runtime execution of computer readable instructions. Examples disclosed herein increase the efficiency of the execution of computer source code by allocating computationally intensive sections of code to FPGA and other parts of text to CPU. Examples disclosed herein combines the advantages of Ahead of Time compilation and Just in Time compilation, by compiling multiple bitstream kernels for tagged blocks of code for execution by a FPGA. In this manner, during run time example disclosed herein can dynamically adjust between different bitstream kernels based on the status of the FPGA. Accordingly, if the FPGA is overworked or otherwise unavailable to execute bitstream kernels of a particular type, examples disclosed herein can dynamically adjust to different types of bitstream kernels that were compiled before runtime. Additionally, example disclosed herein can adjust from the bitstream kernels to machine code corresponding to the bytecode to be executed by a CPU. Using examples disclosed herein, computer readable instructions are more efficiently executed by allowing for a dynamic adjustment of execution of computationally intensive high level source code using both CPU and FPGA, without risking overloading the FPGA.

Example 1 is an apparatus to facilitate field-programmable gate array support during runtime execution of computer readable instructions. Example 1 includes a compiler to, prior to runtime, compile a block of code written as high level source code into a first hardware bitstream kernel and a second hardware bitstream kernel. Example 1 further includes a kernel selector to select the first hardware bitstream kernel to be dispatched during runtime based on an attribute. Example 1 further includes a dispatcher to dispatch the first hardware bitstream kernel to a field programmable gate array (FPGA) during runtime. Example 1 further includes the kernel selector to, when an FPGA attribute does not satisfy a threshold during runtime, adjust the selection of the first hardware bitstream kernel to the second hardware bitstream kernel to be dispatched during runtime.

Example 2 includes the subject matter of Example 1, wherein the compiler is to compile the block of code into bytecode.

Example 3 includes the subject matter of Example 2, wherein the kernel selector is to, when at least one of (A) a performance of the FPGA is below a performance threshold or (B) resources of the FPGA are low, adjust the selection of the first or second hardware bitstream kernel to the bytecode; and the dispatcher is to dispatch machine code corresponding to the bytecode to central processing unit (CPU) components during runtime.

Example 4 includes the subject matter of Examples 1-3, further including a tag identifier to identify the attribute in a policy defined by a developer.

Example 5 includes the subject matter of Examples 1-3, further including a tag identifier to determine that the block of code was tagged for FPGA support by a developer.

Example 6 includes the subject matter of Examples 1-3, further including a profiler to monitor the FPGA attribute of the FPGA during runtime.

Example 7 includes the subject matter of Examples 1-3, wherein the compiler is to, prior to runtime, compile a second block of code written as high level source code into bytecode; and the dispatcher is to dispatch machine code corresponding to the bytecode to CPU components during runtime.

Example 8 includes the subject matter of Example 7, further including a profiler to monitor the CPU components during runtime to determine if the second block of code is computationally intensive; and, when the second block of code is computationally intensive, flag the second block of code.

Example 9 includes the subject matter of Examples 1-3, wherein the compiler is to, prior to runtime, compile a second block of code written as high level source code into a third hardware bitstream kernel and a fourth hardware bitstream kernel; the kernel selector to select the third hardware bitstream kernel to be dispatched during runtime based on the attribute; and the dispatcher to dispatch the third hardware bitstream kernel to the FPGA during runtime.

Example 10 includes the subject matter of Example 9, further including a profiler to order the block of code and the second block of code based on an amount of times used in an application, the kernel selector to, when the FPGA has insufficient resources to execute the first and third hardware bitstream kernels during runtime, adjust the selection of at least one of (A) the first hardware bitstream kernel to the second hardware bitstream kernel or (B) the third hardware bitstream kernel to the fourth hardware bitstream kernel prior to runtime.

Example 11 is a method to facilitate field-programmable gate array support during runtime execution of computer readable instructions. Example 11 includes compiling, prior to runtime, a block of code written as high level source code into a first hardware bitstream kernel and a second hardware bitstream kernel. Example 11 further includes selecting the first hardware bitstream kernel to be dispatched during runtime based on an attribute. Example 11 further includes dispatching the first hardware bitstream kernel to a FPGA during runtime. Example 11 further includes, when a FPGA attribute does not satisfy a threshold during runtime, adjusting the selection of the first hardware bitstream kernel to the second hardware bitstream kernel to be dispatched during runtime.

Example 12 includes the subject matter of Example 11, further including compiling the block of code into bytecode.

Example 13 includes the subject matter of Example 12, further including, when at least one of (A) a performance of the FPGA is below a performance threshold or (B) resources of the FPGA are low, adjusting the selection of the first or second hardware bitstream kernel to the bytecode; and dispatching the bytecode to CPU components during runtime.

Example 14 includes the subject matter of Examples 11-13, further including identifying the attribute is identified in a policy defined by a developer.

Example 15 includes the subject matter of Examples 11-13, further including determining that the block of code was tagged for FPGA support by a developer.

Example 16 includes the subject matter of Examples 11-13, further including monitoring the FPGA attribute of the FPGA during runtime.

Example 17 includes the subject matter of Examples 11-13, further including compiling, prior to runtime, a second block of code written as high level source code into bytecode; and dispatching the bytecode to CPU components during runtime.

Example 18 includes the subject matter of Example 17, further including monitoring the CPU components during runtime to determine if the second block of code is computationally intensive; and when the second block of code is computationally intensive, flagging the block of code.

Example 19 includes the subject matter of Examples 11-13, further including compiling, prior to runtime, a second block of code written as high level source code into a third hardware bitstream kernel and a fourth hardware bitstream kernel; selecting the third hardware bitstream kernel to be dispatched during runtime based on the attribute; and dispatching the third hardware bitstream kernel to the FPGA during runtime.

Example 20 includes the subject matter of Example 19, further including ordering the block of code and the second block of code based on an amount of times used in an application; and when the FPGA has insufficient resources to execute the first and third hardware bitstream kernels during runtime, adjusting the selection of at least one of (A) the first hardware bitstream kernel to the second hardware bitstream kernel or (B) the third hardware bitstream kernel to the fourth hardware bitstream kernel prior to runtime.

Example 21 is a tangible computer readable storage medium comprising instructions which, when executed, cause a machine to at least compile, prior to runtime, a block of code written as high level source code into a first hardware bitstream kernel and a second hardware bitstream kernel. Example 21 further includes instructions to cause the machine to select the first hardware bitstream kernel to be dispatched during runtime based on an attribute. Example 21 further includes instructions to cause the machine to dispatch the first hardware bitstream kernel to a FPGA during runtime. Example 21 further includes instructions to cause the machine to, when a FPGA attribute does not satisfy a threshold during runtime, adjust the selection of the first hardware bitstream kernel to the second hardware bitstream kernel to be dispatched during runtime.

Example 22 includes the subject matter of Example 21, wherein the instructions cause the machine to compile the block of code into bytecode.

Example 23 includes the subject matter of Example 22, wherein the instructions cause the machine to, when at least one of (A) a performance of the FPGA is below a performance threshold or (B) resources of the FPGA are low, adjust the selection of the first or second hardware bitstream kernel to the bytecode; and machine code corresponding to dispatch the bytecode to CPU components during runtime.

Example 24 includes the subject matter of Examples 21-23, wherein the instructions cause the machine to identify the attribute is identified in a policy defined by a developer.

Example 25 includes the subject matter of Examples 21-23, wherein the instructions cause the machine to determine that the block of code was tagged for FPGA support by a developer.

Example 26 includes the subject matter of Examples 21-23, wherein the instructions cause the machine to monitor the FPGA attribute of the FPGA during runtime.

Example 27 includes the subject matter of Examples 21-23, wherein the instructions cause the machine to compile, prior to runtime, a second block of code written as high level source code into bytecode; and dispatch the bytecode to CPU components during runtime.

Example 28 includes the subject matter of Example 27, wherein the instructions cause the machine to monitor the CPU components during runtime to determine if the second block of code is computationally intensive; and when the second block of code is computationally intensive, flag second the block of code.

Example 29 includes the subject matter of Examples 21-23, wherein the instructions cause the machine to compile, prior to runtime, a second block of code written as high level source code into a third hardware bitstream kernel and a fourth hardware bitstream kernel; select the third hardware bitstream kernel to be dispatched during runtime based on the attribute; and dispatch the third hardware bitstream kernel to the FPGA during runtime.

Example 30 includes the subject matter of Example 29, wherein the instructions cause the machine to order the block of code and the second block of code based on an amount of times used in an application; and when the FPGA has insufficient resources to execute the first and third hardware bitstream kernels during runtime, adjust the selection of at least one of (A) the first hardware bitstream kernel to the second hardware bitstream kernel or (B) the third hardware bitstream kernel to the fourth hardware bitstream kernel prior to runtime.

Example 31 is an apparatus to facilitate field-programmable gate array support during runtime execution of computer readable instructions. Example 31 includes a dispatcher to dispatch a first hardware bitstream kernel to a FPGA during runtime, the first hardware bitstream kernel corresponding to a block of code written as high level source code and compiled into the first hardware bitstream kernel. Example 31 further includes a profiler to monitor an FPGA attribute of the FPGA during runtime. Example 31 further includes a kernel selector to, when the FPGA attribute does not satisfy a threshold, select a second hardware bitstream kernel corresponding to the block of code to the FPGA to be dispatched for subsequent use during runtime.

Example 32 includes the subject matter of Example 31, further including a compiler to compile the block of code into the first hardware bitstream kernel and the second hardware bitstream kernel prior to runtime.

Example 33 includes the subject matter of Example 32, wherein the compiler is to compile the block of code into bytecode.

Example 34 includes the subject matter of Example 33, wherein the kernel selector is to, when at least one of (A) a performance of the FPGA is below a performance threshold or (B) resources of the FPGA are low, select the bytecode to be dispatched to CPU components for subsequent use during runtime.

Example 35 includes the subject matter of Examples 31-34, wherein the dispatcher to dispatch machine code corresponding to bytecode to CPU components during runtime, the bytecode corresponding to a second block of code written as high level source code and compiled into the bytecode.

Example 36 includes the subject matter of Examples 31-34, wherein the first hardware bitstream kernel has a first effect on the FPGA attribute and the second hardware bitstream kernel has a second affect, different than the first effect, on the FPGA attribute.

Example 37 is a method to facilitate field-programmable gate array support during runtime execution of computer readable instructions. Example 37 includes dispatching a first hardware bitstream kernel to a FPGA during runtime, the first hardware bitstream kernel corresponding to a block of code written as high level source code and compiled into the first hardware bitstream kernel. Example 37 further includes monitoring an FPGA attribute of the FPGA during runtime. Example 37 further includes when the FPGA attribute does not satisfy a threshold, selecting a second hardware bitstream kernel corresponding to the block of code to the FPGA to be dispatched for subsequent use during runtime.

Example 38 includes the subject matter of Example 37, further including compiling the block of code into the first hardware bitstream kernel and the second hardware bitstream kernel prior to runtime.

Example 39 includes the subject matter of Example 38, further including compiling the block of code into bytecode.

Example 40 includes the subject matter of Example 39, further including, when at least one of (A) a performance of the FPGA is below a performance threshold or (B) resources of the FPGA are low, selecting the bytecode to be dispatched to CPU components for subsequent use during runtime.

Example 41 includes the subject matter of Examples 37-40, further including dispatching machine code corresponding to bytecode to CPU components during runtime, the bytecode corresponding to a second block of code written as high level source code and compiled into the bytecode.

Example 42 includes the subject matter of Examples 37-40, wherein the first hardware bitstream kernel has a first effect on the FPGA attribute and the second hardware bitstream kernel has a second affect, different than the first effect, on the FPGA attribute.

Example 43 is a tangible computer readable storage medium comprising instructions which, when executed, cause a machine to at least dispatch a first hardware bitstream kernel to a FPGA during runtime, the first hardware bitstream kernel corresponding to a block of code written as high level source code and compiled into the first hardware bitstream kernel. Example 43 further includes instructions to cause a machine to monitor an FPGA attribute of the FPGA during runtime. Example 43 further includes instructions to cause a machine to when the FPGA attribute does not satisfy a threshold, select a second hardware bitstream kernel corresponding to the block of code to the FPGA to be dispatched for subsequent use during runtime.

Example 44 includes the subject matter of Example 43, wherein the instructions cause the machine to compile the block of code into the first hardware bitstream kernel and the second hardware bitstream kernel prior to runtime.

Example 45 includes the subject matter of Example 44, wherein the instructions cause the machine to compile the block of code into bytecode.

Example 46 includes the subject matter of Example 45, wherein the instructions cause the machine to, when at least one of (A) a performance of the FPGA is below a performance threshold or (B) resources of the FPGA are low, select the bytecode to be dispatched to CPU components for subsequent use during runtime.

Example 47 includes the subject matter of Examples 43-46, wherein the instructions cause the machine to dispatch machine code corresponding to bytecode to CPU components during runtime, the bytecode corresponding to a second block of code written as high level source code and compiled into the bytecode.

Example 48 includes the subject matter of Examples 43-46, wherein the first hardware bitstream kernel has a first effect on the FPGA attribute and the second hardware bitstream kernel has a second affect, different than the first effect, on the FPGA attribute.

Example 49 is an apparatus to facilitate field-programmable gate array support during runtime execution of computer readable instructions. Example 49 includes a first means for, prior to runtime, compiling a block of code written as high level source code into a first hardware bitstream kernel and a second hardware bitstream kernel; a second means for selecting the first hardware bitstream kernel to be dispatched during runtime based on an attribute; a third means for dispatching the first hardware bitstream kernel to a field programmable gate array (FPGA) during runtime; and the second means including means for, when an FPGA attribute does not satisfy a threshold during runtime, adjusting the selection of the first hardware bitstream kernel to the second hardware bitstream kernel to be dispatched during runtime.

Example 50 includes the subject matter of Example 49, wherein the first means includes means for compiling the block of code into bytecode.

Example 51 includes the subject matter of Example 50, wherein: the second means including means for, when at least one of (A) a performance of the FPGA is below a performance threshold or (B) resources of the FPGA are low, adjusting the selection of the first or second hardware bitstream kernel to the bytecode; and the third means including means for dispatching machine code corresponding to the bytecode to central processing unit (CPU) components during runtime.

Example 52 includes the subject matter of Examples 49-51, further including a fourth means for identifying the attribute in a policy defined by a developer.

Example 53 includes the subject matter of Examples 49-51, further including a fourth means for determining that the block of code was tagged for FPGA support by a developer.

Example 54 includes the subject matter of Examples 49-51, further including a fifth means for monitoring the FPGA attribute of the FPGA during runtime.

Example 55 includes the subject matter of Examples 49-51, wherein: the first means includes means for, prior to runtime, compiling a second block of code written as high level source code into bytecode; and the third means including means for dispatching the machine code corresponding to bytecode to CPU components during runtime.

Example 56 includes the subject matter of Example 55, further including a fifth means for: monitoring the CPU components during runtime to determine if the second block of code is computationally intensive; and when the second block of code is computationally intensive, flagging the second block of code.

Example 57 includes the subject matter of Examples 49-51, wherein: the first means includes means for, prior to runtime, compiling a second block of code written as high level source code into a third hardware bitstream kernel and a fourth hardware bitstream kernel; the second means including means for selecting the third hardware bitstream kernel to be dispatched during runtime based on the attribute; and the third means including means for dispatching the third hardware bitstream kernel to the FPGA during runtime.

Example 58 includes the subject matter of Example 57, further including a fifth means for ordering the block of code and the second block of code based on an amount of times used in an application, the second means including means for, when the FPGA has insufficient resources to execute the first and third hardware bitstream kernels during runtime, adjusting the selection of at least one of (A) the first hardware bitstream kernel to the second hardware bitstream kernel or (B) the third hardware bitstream kernel to the fourth hardware bitstream kernel prior to runtime.

Example 59 is an apparatus to facilitate field-programmable gate array support during runtime execution of computer readable instructions. Example 59 includes a first means for dispatching a first hardware bitstream kernel to a FPGA during runtime, the first hardware bitstream kernel corresponding to a block of code written as high level source code and compiled into the first hardware bitstream kernel; a second means for monitoring an FPGA attribute of the FPGA during runtime; and a third means for, when the FPGA attribute does not satisfy a threshold, selecting a second hardware bitstream kernel corresponding to the block of code to the FPGA to be dispatched for subsequent use during runtime.

Example 60 includes the subject matter of Example 31, further including a fourth means for compiling the block of code into the first hardware bitstream kernel and the second hardware bitstream kernel prior to runtime.

Example 61 includes the subject matter of Example 32, wherein the fourth means includes means for compiling the block of code into bytecode.

Example 62 includes the subject matter of Example 33, wherein the third means includes means for, when at least one of (A) a performance of the FPGA is below a performance threshold or (B) resources of the FPGA are low, selecting the bytecode to be dispatched to CPU components for subsequent use during runtime.

Example 63 includes the subject matter of Examples 31-34, wherein the first means includes means for dispatching machine code corresponding to bytecode to CPU components during runtime, the bytecode corresponding to a second block of code written as high level source code and compiled into the bytecode.

Example 64 includes the subject matter of Examples 31-34, wherein the first hardware bitstream kernel has a first effect on the FPGA attribute and the second hardware bitstream kernel has a second affect, different than the first effect, on the FPGA attribute.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a compiler, prior to runtime, to compile, via a logic circuit, a block of high-level source code representative of a function into (1) a first hardware bitstream kernel, the first hardware bitstream kernel configured to optimize a first attribute of a field programmable gate array (FPGA), the first hardware bitstream kernel to be used by the FPGA to perform the function and (2) a second hardware bitstream kernel, different than the first hardware bitstream kernel, the second hardware bitstream kernel configured to optimize a second attribute of the FPGA different than the first attribute, the second hardware bitstream kernel to be used by the FPGA to perform the function;
   a kernel selector of a virtual machine to select, via a logic circuit, the first hardware bitstream kernel to be dispatched during runtime based on the first attribute;
   a dispatcher of the virtual machine to dispatch, via a logic circuit, the first hardware bitstream kernel to the FPGA during runtime; and
   the kernel selector of the virtual machine to, when the first attribute does not satisfy a threshold during runtime, adjust, via a logic circuit, the selection of the first hardware bitstream kernel to the second hardware bitstream kernel to be dispatched during runtime to perform the function.

2. The apparatus of claim 1, wherein the compiler is to compile the block of high-level source code representation of the function into bytecode.

3. The apparatus of claim 2, wherein:
   the kernel selector is to, when at least one of (A) a performance of the FPGA is below a performance threshold or (B) resources of the FPGA are low, adjust the selection of the first or second hardware bitstream kernel to the bytecode; and the dispatcher is to dispatch machine code corresponding to the bytecode to central processing unit (CPU) components during runtime.

4. The apparatus of claim 1, further including a tag identifier to identify the first attribute and the second attribute in a policy defined by a developer.

5. The apparatus of claim 1, further including a tag identifier to determine, via a logic circuit, that the block of high-level source code representative of the function was tagged for FPGA support by a developer.

6. The apparatus of claim 1, further including a profiler to monitor, via a logic circuit, the first attribute of the FPGA during runtime.

7. The apparatus of claim 1, wherein the function is a first function, and wherein:

the compiler is to, prior to runtime, compile a second block of high-level source code representative of a second function into bytecode; and the dispatcher is to dispatch machine code corresponding to bytecode to CPU components during runtime.

8. The apparatus of claim 7, further including a profiler to:

monitor, via a logic circuit, the CPU components during runtime to determine if the second block of high-level source code representative of the second function is computationally intensive; and when the second block of high-level source code representative of the second function is computationally intensive, flag, via a logic circuit, the second block of high-level source code representative of the second function.

9. The apparatus of claim 1, wherein the function is a first function, and wherein:

the compiler is to, prior to runtime, compile a second block of high-level source code representative of a second function, different than the first function into (1) a third hardware bitstream kernel, the third hardware bitstream kernel configured to optimize a third attribute of the FPGA, the third hardware bitstream kernel to be used by the FPGA to perform the second block of high-level source code representative of the second function and (2) a fourth hardware bitstream kernel, different from the third hardware bitstream kernel, the fourth hardware bitstream kernel configured to optimize a fourth attribute of the FPGA, the fourth hardware bitstream kernel to be used by the FPGA to perform the second block of high-level source code representative of the second function;

the kernel selector to select the third hardware bitstream kernel to be dispatched during runtime based on the third attribute; and the dispatcher to dispatch the third hardware bitstream kernel to the FPGA during runtime to perform the second block of high-level source code representative of the second function.

10. The apparatus of claim 9, further including a profiler to order the function and the second function based on an amount of times used in an application, the kernel selector to, when the FPGA has insufficient resources to execute the first and third hardware bitstream kernels during runtime, adjust the selection of at least one of (A) the first hardware bitstream kernel to the second hardware bitstream kernel to perform the function or (B) the third hardware bitstream kernel to the fourth hardware bitstream kernel prior to runtime to perform the second function.

11. The apparatus of claim 1, wherein the block of high-level source code representative of the function includes one or more of a class or a method.

12. A method comprising:

compiling via a logic circuit, prior to runtime, a block of high-level source code representative of a function into (1) a first hardware bitstream kernel, the first hardware bitstream kernel configured to optimize a first attribute of a field programmable gate array (FPGA), the first hardware bitstream kernel to be used by the FPGA to perform the function and (2) a second hardware bitstream kernel, different than the first hardware bitstream kernel, the second hardware bitstream kernel configured to optimize a second attribute of the FPGA different than the first attribute, the second hardware bitstream kernel to be used by the FPGA to perform the function;

selecting, via a logic circuit, the first hardware bitstream kernel to be dispatched during runtime based on the first attribute;

dispatching, via a logic circuit, the first hardware bitstream kernel to the FPGA during runtime; and when the first attribute does not satisfy a threshold during runtime, adjusting, via a logic circuit, the selection of the first hardware bitstream kernel to the second hardware bitstream kernel to be dispatched during runtime to perform the function.

13. The method of claim 12, further including compiling the block of high-level source code representative of the function into bytecode.

14. The method of claim 13, further including:

when at least one of (A) a performance of the FPGA is below a performance threshold or (B) resources of the FPGA are low, adjusting the selection of the first or second hardware bitstream kernel to the bytecode; and dispatching machine code corresponding to the bytecode to CPU components during runtime.

15. The method of claim 12, further including determining, via a logic circuit, that the block of high-level source code representative of the function was tagged for FPGA support by a developer.

16. The method of claim 12, further including monitoring, via a logic circuit, the first attribute of the FPGA during runtime.

17. The method of claim 12, wherein the function is a first function, the method further including:

compiling, prior to runtime, a second block of high-level source code representative of a second function, different than the first function into bytecode; and dispatching machine code corresponding to bytecode to CPU components during runtime.

18. The method of claim 17, further including:

monitoring the CPU components during runtime to determine if the second block of high-level source code representative of the second function is computationally intensive; and when the second block of high-level source code representative of the second function is computationally intensive, flagging the second block of high-level source code representative of the second function.

19. A non-transitory computer readable storage medium comprising instructions which, when executed, cause a machine to at least:

compile via a logic circuit, prior to runtime, a block of high-level source code representative of a function into (1) a first hardware bitstream kernel, the first hardware bitstream kernel configured to optimize a first attribute of a field programmable gate array (FPGA), the first hardware bitstream kernel to be used by the FPGA to perform the function and (2) a second hardware bitstream kernel, different from the first hardware bitstream kernel, the second hardware bitstream kernel configured to optimize a second attribute of the FPGA different than the first attribute, the second hardware bitstream kernel to be used by the FPGA to perform the function;

select, via a logic circuit, the first hardware bitstream kernel to be dispatched during runtime based on the first attribute;

dispatch, via a logic circuit, the first hardware bitstream kernel to the FPGA during runtime; and when the first attribute does not satisfy a threshold during runtime, adjust, via a logic circuit, the selection of the first hardware bitstream kernel to the second hardware bitstream kernel to be dispatched during runtime to perform the function.

20. The non-transitory computer readable storage medium of claim 19, wherein the instructions, when executed, cause the machine to compile the block of high-level source code representative of the function into bytecode.

\* \* \* \* \*